United States Patent
Karumi

(10) Patent No.: US 10,651,630 B2
(45) Date of Patent: May 12, 2020

(54) SPARK PLUG ELECTRODE WEARING RATE ESTIMATING METHOD AND APPARATUS

(71) Applicant: NGK Spark Plug Co., LTD., Nagoya (JP)

(72) Inventor: Takahiro Karumi, Nagoya (JP)

(73) Assignee: NGK Spark Plug Co., LTD., Nagoya (JP)

( * ) Notice: Subject to any disclaimer, the term of this patent is extended or adjusted under 35 U.S.C. 154(b) by 0 days.

(21) Appl. No.: 16/420,613

(22) Filed: May 23, 2019

(65) Prior Publication Data
US 2019/0372313 A1    Dec. 5, 2019

(30) Foreign Application Priority Data
May 30, 2018    (JP) ................. 2018-103236

(51) Int. Cl.
*H01T 13/20*    (2006.01)
*F02P 17/12*    (2006.01)
*H01T 21/02*    (2006.01)
*H01T 13/58*    (2020.01)

(52) U.S. Cl.
CPC .............. *H01T 13/20* (2013.01); *F02P 17/12* (2013.01); *H01T 13/58* (2013.01); *H01T 21/02* (2013.01)

(58) Field of Classification Search
None
See application file for complete search history.

(56) References Cited

FOREIGN PATENT DOCUMENTS

JP        2014-17153 A       1/2014

*Primary Examiner* — Vip Patel
(74) *Attorney, Agent, or Firm* — Leason Ellis LLP

(57) ABSTRACT

A spark plug electrode wearing rate estimating method for a spark plug in which spark discharge occurs between two electrodes by application of voltage generated by an ignition coil, includes the step of estimating a wearing rate of a first electrode in one spark discharge based on a temperature of the first electrode, and a spark discharge voltage and supply energy from the ignition coil. The first electrode contains any one of Ir, Ru, W, and Ni as a main component.

6 Claims, 4 Drawing Sheets

SPARK PLUG ELECTRODE WEARING RATE ESTIMATING METHOD AND APPARATUS

This application claims the benefit of Japanese Patent Application No. 2018-103236, filed May 30, 2018, which is incorporated herein by reference in its entirety.

FIELD OF THE INVENTION

The present invention relates to spark plug electrode wearing rate estimating method and apparatus.

BACKGROUND OF THE INVENTION

As a technique for estimating an electrode wearing rate in spark discharge of a spark plug, Japanese Unexamined Publication No. 2014-17153 discloses a technique for generating spark discharge between electrodes in atmospheric gas, decomposing, for each wavelength, light emitted by the spark discharge, calculating an emission intensity based on the result of a taken image, and estimating an electrode wearing rate according to previously obtained correlation between emission intensities and electrode wearing rates.

Problems to be Solved by the Invention

However, in the above-described technique, correlation between an emission intensity and an electrode wearing rate in argon gas is obtained such that an emission wavelength range of an electrode and an emission wavelength range of atmospheric gas do not overlap each other. However, an electrode is worn in combustible air-fuel mixture in practice. Therefore, there is a problem of accuracy of an estimation result based on correlation obtained in a different kind of atmospheric gas.

The present invention is made in order to solve the aforementioned problem, and an object of the present invention is to provide spark plug electrode wearing rate estimating method and apparatus which allow accuracy of an estimation result to be improved.

SUMMARY OF THE INVENTION

Means for Solving the Problems

In order to attain the object, a spark plug electrode wearing rate estimating method according to the present invention includes the step of providing two electrodes, at least one of which is a first electrode that contains any one of Ir, Ru, W, and Ni as a main component, and the step of estimating a wearing rate of a first electrode in one spark discharge, based on a temperature of the first electrode, and a spark discharge voltage and supply energy from the ignition coil. The first electrode contains any one of Ir, Ru, W, and Ni as a main component.

Furthermore, a spark plug electrode wearing rate estimating method according to the present invention includes the step of estimating a wearing rate of a second electrode in one spark discharge based on a spark discharge voltage and supply energy from the ignition coil. The second electrode contains Pt as a main component.

A spark plug electrode wearing rate estimating apparatus according to the present invention includes: an obtaining unit configured to obtain information on a temperature of the first electrode, and spark discharge voltage and supply energy from the ignition coil; and a wearing rate estimation unit configured to estimate a wearing rate of the first electrode in one spark discharge based on the information.

Furthermore, a spark plug electrode wearing rate estimating apparatus according to the present invention includes: an obtaining unit configured to obtain information on spark discharge voltage and supply energy from the ignition coil; and a wearing rate estimation unit configured to estimate a wearing rate of the second electrode in one spark discharge based on the information.

Effects of the Invention

In the spark plug electrode wearing rate estimating method according to a first aspect, a wearing rate of the first electrode in one spark discharge is estimated based on a temperature of the first electrode, and spark discharge voltage and supply energy from the ignition coil. In the first electrode that contains any one of Ir, Ru, W, and Ni as a main component, electrode wear is influenced by high temperature oxidation. Therefore, a wearing rate of the first electrode is estimated based on a temperature of the first electrode, and spark discharge voltage and supply energy from the ignition coil, thereby improving accuracy of the estimation result.

In the spark plug electrode wearing rate estimating method according to a second aspect, a wearing rate of the second electrode in one spark discharge is estimated based on spark discharge voltage and supply energy from the ignition coil. The second electrode that contains Pt as a main component is less likely to be subjected to high temperature oxidation. Therefore, a wearing rate of the second electrode is estimated based on spark discharge voltage and supply energy from the ignition coil, thereby improving accuracy of the estimation result.

In the spark plug electrode wearing rate estimating method according to a third aspect, one of the two electrodes is the first electrode, and the other of the two electrodes is the second electrode that contains Pt as a main component. A wearing rate of the second electrode in one spark discharge is estimated based on spark discharge voltage and supply energy from the ignition coil. Therefore, each of electrode wearing rates of the first electrode and the second electrode made of different materials, respectively, can be accurately estimated in addition to the effect of the first aspect being obtained.

In the spark plug electrode wearing rate estimating method according to a fourth aspect, an increase amount of a spark gap between the two electrodes is estimated based on results obtained after wearing rates of the first electrode and the second electrode have been estimated. An increase amount of a gap length based on wear of the first electrode and an increase amount of a gap length based on wear of the second electrode can be each estimated. Therefore, an increase amount of a spark gap between the two electrodes can be accurately estimated in addition to the effect of the third aspect being obtained.

The electrode wearing rate estimating apparatus according to a fifth aspect and the electrode wearing rate estimating apparatus according to a sixth aspect exhibit the same effects as the effects of the first aspect and the second aspect, respectively.

BRIEF DESCRIPTION OF THE DRAWINGS

These and other features and advantages of the present invention will become more readily appreciated when considered in connection with the following detailed description and appended drawings, wherein like designations denote like elements in the various views, and wherein.

DETAILED DESCRIPTION OF THE INVENTION

Figure 1:
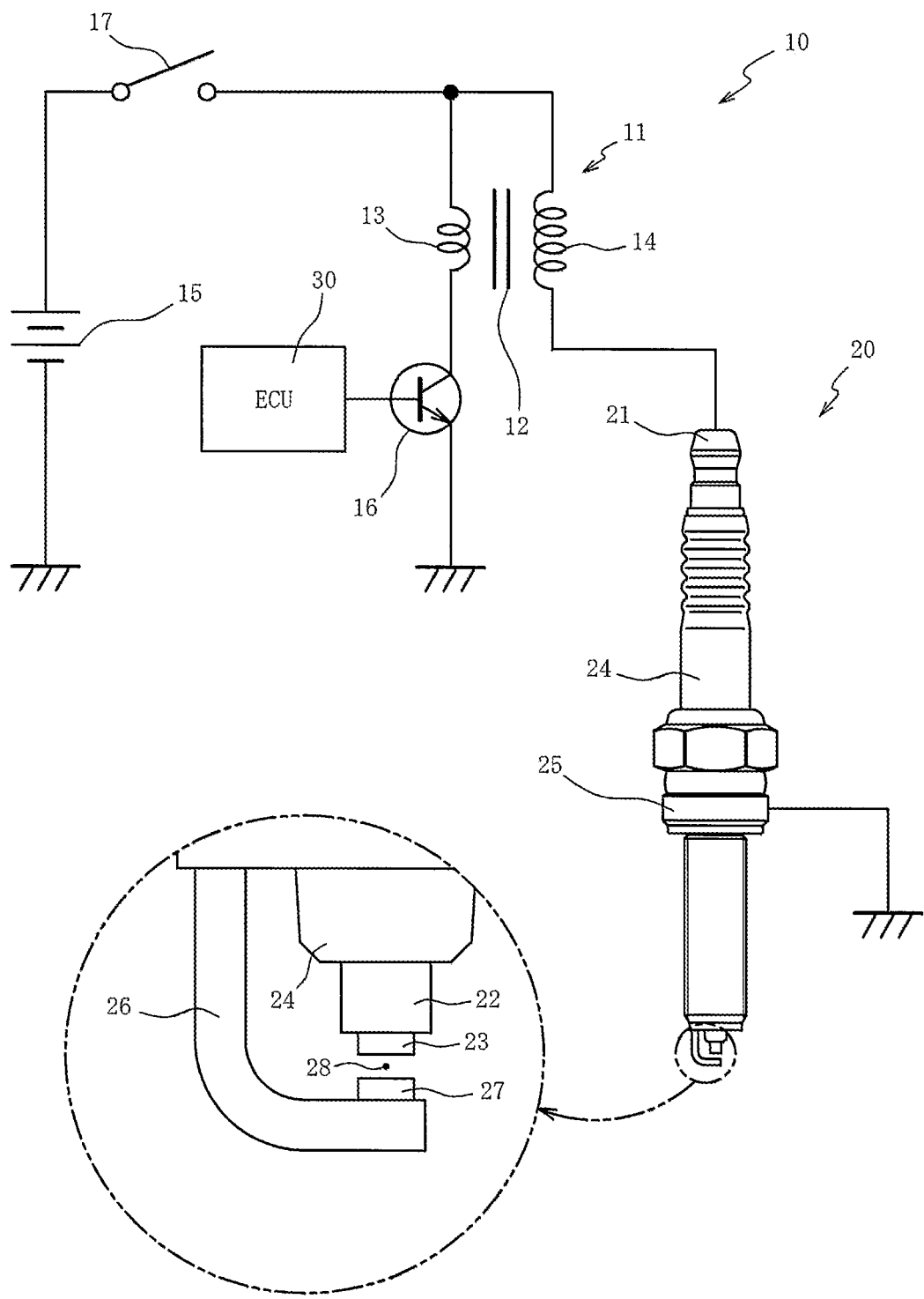
FIG. 1 is a schematic view of an ignition system.

Hereinafter, a preferred embodiment of the present invention will be described with reference to the accompanying drawings. FIG. 1 is a schematic view of an ignition system 10. The ignition system 10 is a device for igniting combustible air-fuel mixture in an engine (not shown), and mainly includes an ignition coil 11, a power switch 16, and a spark plug 20.

The ignition coil 11 includes a primary winding 13 and a secondary winding 14 that are wound around a core 12. A DC power supply 15 is connected to a power reception side of the primary winding 13, and a grounding side of the primary winding 13 is grounded via the power switch 16. The secondary winding 14 is connected to a metal terminal 21 of the spark plug 20. The ECU 30 is connected to the power switch 16 via an output circuit (not shown) or the like. The ECU 30 controls a time at which the ignition coil 11 applies voltage to the spark plug 20, and controls emission and output of the engine.

The spark plug 20 includes: a center electrode 22 that is electrically connected to the metal terminal 21; an insulator 24 for holding the metal terminal 21 and the center electrode 22; a metal shell 25 that holds the insulator 24 and is grounded; and a ground electrode 26 connected to the metal shell 25. In the present embodiment, a first electrode 23 (tip) is joined to the center electrode 22 that contains Ni as a main component, and a second electrode 27 (tip) is joined to the ground electrode 26 that contains Ni as a main component. A spark gap 28 is formed between the first electrode 23 and the second electrode 27. The first electrode 23 contains any one of Ir, Ru, W, and Ni as a main component. The second electrode 27 contains Pt as a main component. The main component is a component that occupies 50% or more by mass of all the components of each of the first electrode 23 and the second electrode 27.

The tips to be joined to the center electrode 22 and the ground electrode 26 may not necessarily be provided. The spark gap 28 can be formed between the center electrode 22 and the ground electrode 26 without joining the tips thereto. In a case where no tips are joined thereto, at least a portion, of the center electrode 22 and/or the ground electrode 26, where spark discharge is caused may contain any one of Ir, Ru, W, Ni, and Pt as a main component. In this case, the first electrode is formed as a portion that contains any one of Ir, Ru, W, and Ni as a main component, and the second electrode is formed as a portion that contains Pt as a main component.

In the ignition system 10, when an ignition switch 17 is made "on" by a driver, and electric current flows through the primary winding 13 side in the ignition coil 11, the core 12 is magnetized to store magnetic energy, and a magnetic field is generated around the core 12. When primary current is broken by switching of the power switch 16, high voltage (for example, 10 to 30 kV) is generated in the secondary winding 14 which shares a magnetic circuit and magnetic flux with the primary winding 13.

Figure 2:
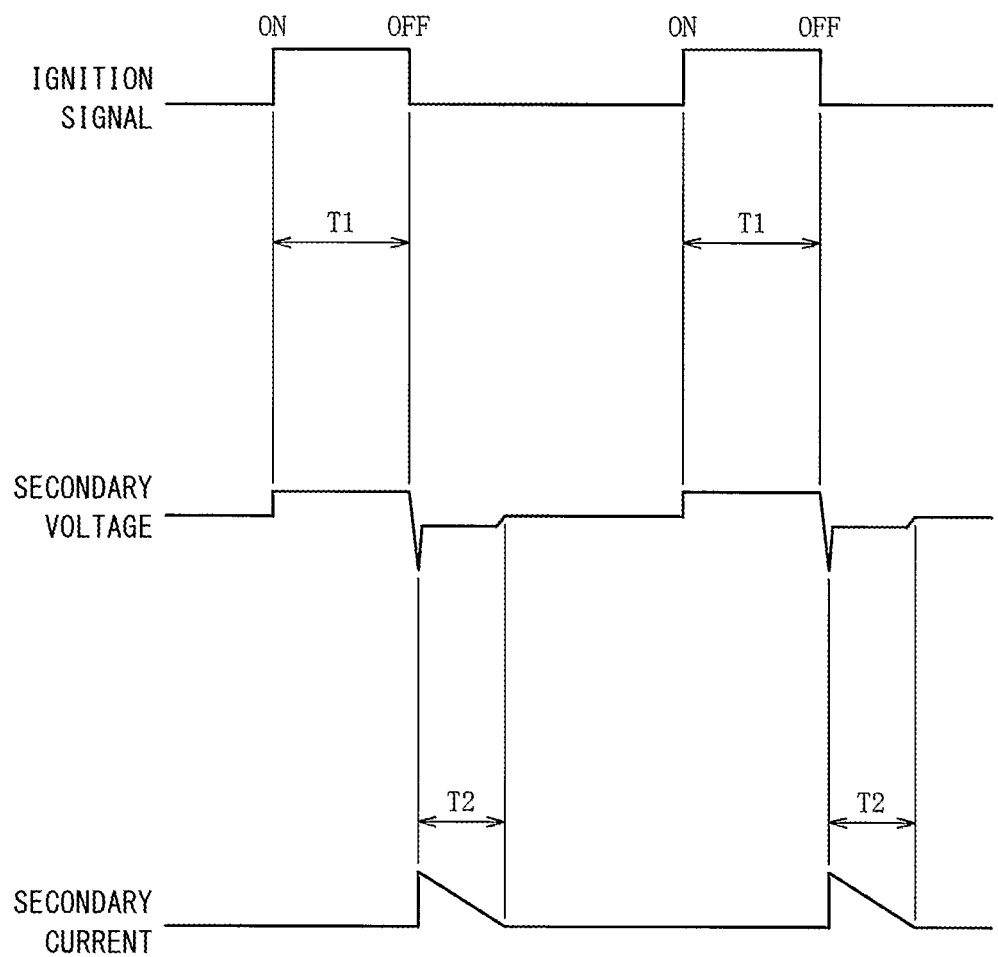
FIG. 2 is a view of a waveform of an operation of the ignition system.

FIG. 2 illustrates a waveform of an operation of the ignition system 10. When an ignition signal generated by the ECU 30 is "on", the power switch 16 becomes conductive, and electric current flows through the primary winding 13, and magnetic energy is stored. After elapse of a charging time T1, when the ECU 30 sets the ignition signal to "off", high voltage is generated in the secondary winding 14, and breakdown of the spark plug 20 occurs, and spark discharge is generated between the first electrode 23 and the second electrode 27 due to magnetic energy emitted by the ignition coil 11 during a time T2 (for example, 0.5 to 2.5 ms).

As described above, the ignition coil 11 supplies the stored magnetic energy to the spark plug 20 according to an ignition signal from the ECU 30. Energy (supply energy) supplied from the ignition coil 11 to the spark plug 20 in one spark discharge when the ECU 30 sets the ignition signal to "off", can be calculated according to voltage and current (secondary voltage and secondary current) of the secondary winding 14 for the time T2.

Figure 3:
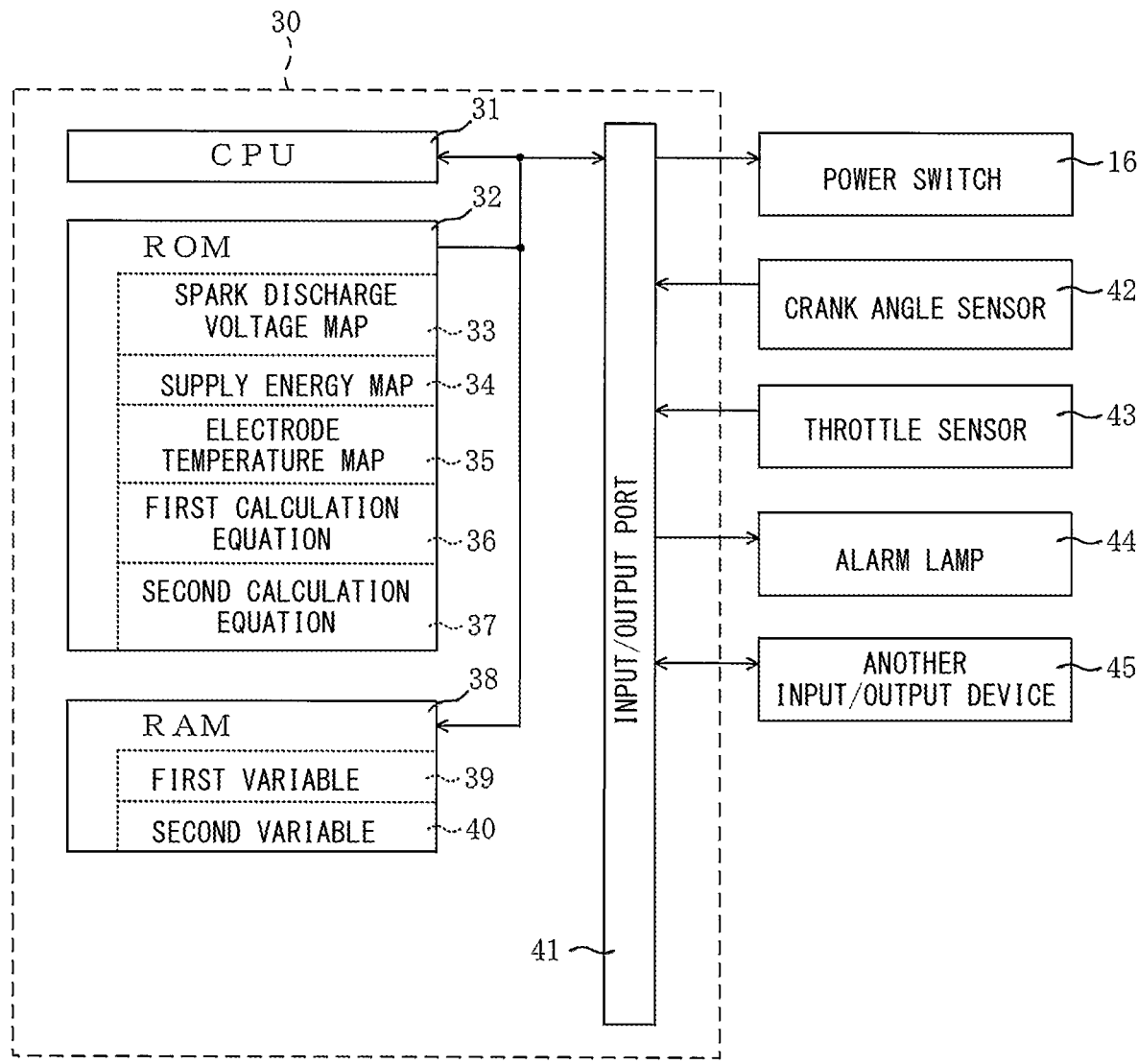
FIG. 3 is a block diagram illustrating an electrode wearing rate estimating apparatus according to one embodiment.

FIG. 3 is a block diagram illustrating an electrode wearing rate estimating apparatus. The ECU 30 is a device for controlling an operation state of the engine (not shown), and is mounted to an automobile. In the present embodiment, the ECU 30 has a function of the electrode wearing rate estimating apparatus. The ECU 30 includes a CPU 31, a ROM 32, and a RAM 38, which are connected to an input/output port 41. Various devices such as the power switch 16 are connected to the input/output port 41.

The CPU 31 is an arithmetic operation unit for controlling each component. The ROM 32 is a non-rewritable nonvolatile memory for storing a control program (for example, a program for a flow chart shown in FIG. 4) executed by the CPU 31, various threshold valves, and the like. A spark discharge voltage map 33, a supply energy map 34, an electrode temperature map 35, a first calculation equation 36, and a second calculation equation 37 are stored in the ROM 32.

In the spark discharge voltage map 33, spark discharge voltages required for spark discharge of the spark plug 20 are stored. The spark discharge voltage is different for each specification of the spark plug 20. The spark discharge voltage is lowered when a rotation speed of the engine is low and load on the engine is low. The spark discharge voltage is enhanced when a rotation speed of the engine is high and load on the engine is high. A spark discharge voltage is measured under various conditions for each of types of the spark plug 20 and the engine by an experiment or the like. The spark discharge voltages are previously stored in the spark discharge voltage map 33 so as to be associated with the rotation speeds of the engines and loads thereon. The spark discharge voltage is calculated by measuring a waveform (see FIG. 2) of an operation of the ignition system 10.

In the supply energy map 34, supply energy from the ignition coil 11 to the spark plug 20 is stored. The supply energy is different for each specification of the ignition coil 11. When the charging time T1 (see FIG. 2) is elongated, the supply energy is increased. When the charging time T1 is shortened, the supply energy is reduced. Therefore, supply energy of the ignition coil 11 is measured under various conditions for each of types of the ignition coil 11 and the engine by an experiment or the like. The supply energies are previously stored in the supply energy map 34 so as to be associated with rotation speeds of the engines and loads thereon. The supply energy is obtained by measuring a waveform (see FIG. 2) of an operation of the ignition system 10.

In the electrode temperature map 35, temperatures (electrode temperatures) of the first electrode 23 are stored. The electrode temperature is different for each specification of the spark plug 20. When a rotation speed of the engine is low and a load on the engine is low, the electrode temperature is lowered. When a rotation speed of the engine is high and a load on the engine is high, the electrode temperature is enhanced. An electrode temperature is measured under various conditions for each of types of the spark plug 20 and the engine by an experiment or the like. The electrode temperatures are previously stored in the electrode temperature map 35 so as to be associated with rotation speeds of the engines and loads thereon.

The electrode temperature can be measured by a thermocouple being embedded in the spark plug 20. For example, a hole is formed in the spark plug 20 so as to reach the first electrode 23, and a temperature measuring junction of the thermocouple can be disposed in the first electrode 23. Furthermore, a hole is formed in the spark plug 20 so as to reach a portion near the first electrode 23, and the temperature measuring junction of the thermocouple can be disposed at the tip end, of the center electrode 22, near the first electrode 23. The temperature measuring junction of the thermocouple can be disposed at a portion, of the center electrode 22, to which the first electrode 23 is to be joined, without providing the first electrode 23. An electrode temperature may be obtained in such a manner that the spark plug 20 is disposed in the engine having an observation window, an image of the first electrode 23 is taken through the observation window by using an infrared camera, and a temperature distribution is measured to obtain the electrode temperature, instead of an electrode temperature being measured by using a thermocouple.

The first calculation equation 36 is a calculation equation for calculating a wearing rate of the first electrode 23 in one spark discharge. The first calculation equation 36 is an equation using at least three parameters that are a temperature (electrode temperature) of the first electrode 23, and spark discharge voltage and supply energy from the ignition coil 11. The first calculation equation 36 is preset by an experiment or the like for each element (Ir, Ru, W, Ni, Pt) that is a main component. Needless to say, in the first calculation equation 36, another parameter by which electrode wear is influenced may be set in addition to these three parameters. For example, an electrostatic capacity between the metal terminal 21 and the metal shell 25 of the spark plug 20, a flow rate in a combustion chamber of the engine, and an oxygen concentration of a combustible air-fuel mixture can be considered as the other parameter.

The second calculation equation 37 is a calculation equation for calculating a wearing rate of the second electrode 27 in one spark discharge. The second calculation equation 37 is an equation using at least two parameters that are spark discharge voltage and supply energy from the ignition coil 11. The second calculation equation 37 is preset by an experiment or the like. Needless to say, in the second calculation equation 37, another parameter by which electrode wear is influenced may be set in addition to these two parameters. For example, an electrostatic capacity between the metal terminal 21 and the metal shell 25 of the spark plug 20, a flow rate in a combustion chamber of the engine, and an oxygen concentration of a combustible air-fuel mixture can be considered as the other parameter. Similarly to the first calculation equation 36, a temperature of the second electrode 27 may be set as one of the parameters for the second calculation equation 37.

The RAM 38 is a rewritable memory for storing various data. A first variable 39 to which a wearing rate of the first electrode 23 in one spark discharge is added, and a second variable 40 to which a wearing rate of the second electrode 27 in one spark discharge is added, are set in the RAM 38. The first variable 39 and the second variable 40 are not reset and are stored in the RAM 38 until the spark plug 20 is changed to a new one.

A crank angle sensor 42 detects a rotation speed of the engine. A throttle sensor 43 detects a throttle angle of a throttle valve. The crank angle sensor 42 and the throttle sensor 43 each include an output circuit for outputting a detection result to the ECU 30. A load on the engine can be estimated according to a throttle angle, of the throttle valve, detected by the throttle sensor 43. An alarm lamp 44 is disposed at a position where the alarm lamp 44 can be viewed by a driver of an automobile.

Examples of another input/output device 45 include an accelerator operation detection sensor for detecting an operation amount of an accelerator pedal, an in-cylinder pressure sensor for detecting a pressure in the combustion chamber of the engine, a water temperature sensor for detecting a temperature of cooling water in the engine, an oil temperature sensor for detecting a temperature of engine oil, an airflow sensor for detecting an inflow amount of air into the engine, an oxygen sensor for detecting an oxygen concentration of exhaust gas, and a vehicle speed sensor for detecting a speed of an automobile. The ECU 30 can estimate, for example, a load on an engine, a rate of airflow in the combustion chamber, and an oxygen concentration (atmosphere) in the combustion chamber, by using the detection results from the sensors.

Figure 4:
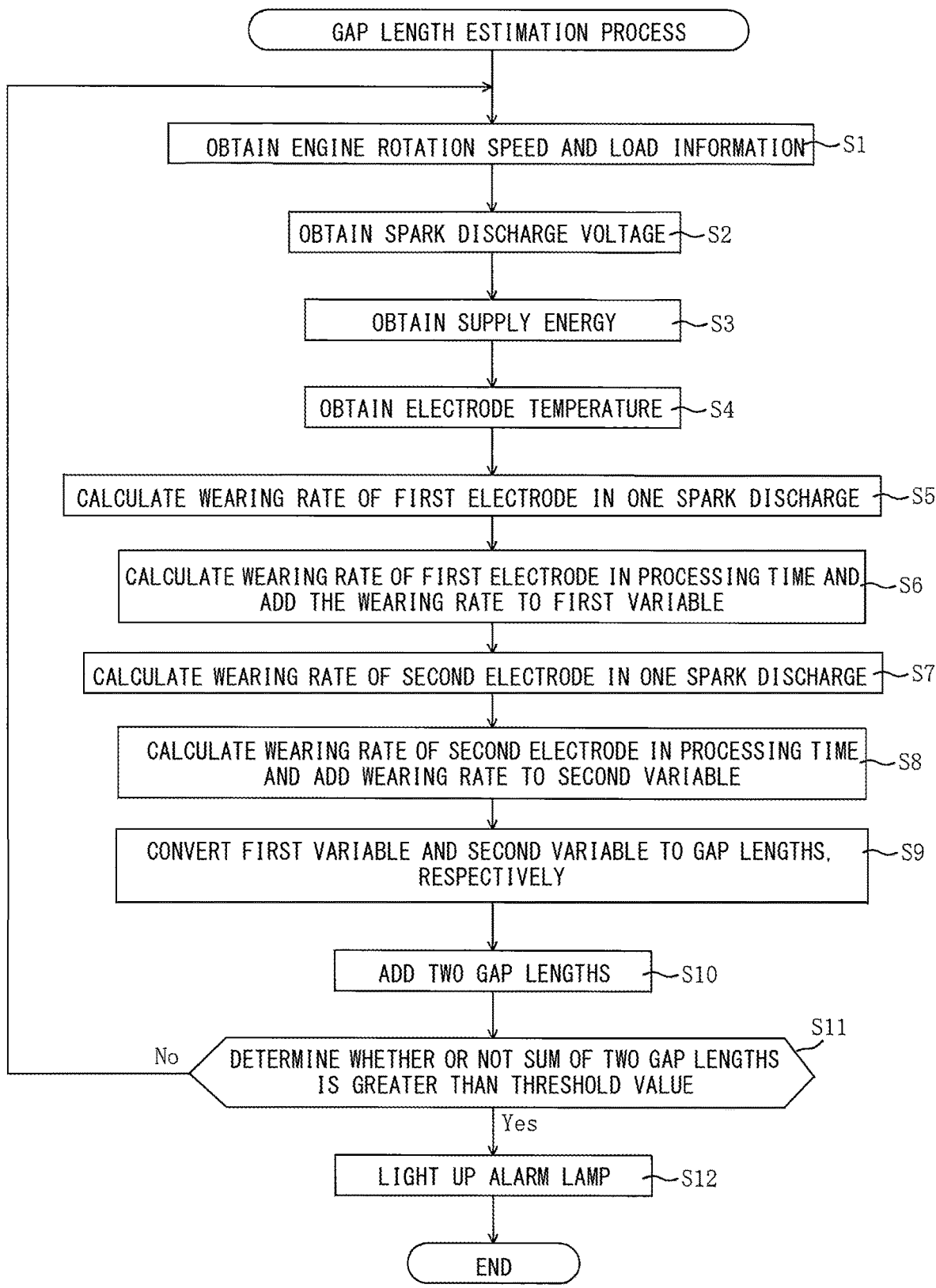
FIG. 4 is a flow chart of a gap length estimation process.

FIG. 4 is a flow chart showing a gap length estimation process. The gap length estimation process is a process for estimating an increase amount of the spark gap 28 between the first electrode 23 and the second electrode 27. The CPU 31 repeatedly (for example, at intervals of 0.2 seconds) performs the gap length estimation process while power supply for the ECU 30 is "on".

In the gap length estimation process, the CPU 31 obtains a rotation speed of the engine according to the detection result from the crank angle sensor 42, and obtains information about a load on the engine according to the detection result from the throttle sensor 43 (S1). Next, the CPU 31 obtains a spark discharge voltage by using the spark discharge voltage map 33 based on the rotation speed of the engine and the load thereon (S2). The CPU 31 obtains supply energy from the ignition coil 11 to the spark plug 20 by using the supply energy map 34 based on the rotation speed of the engine and the load thereon (S3). The CPU 31 obtains a temperature of the first electrode 23 by using the electrode temperature map 35 based on the rotation speed of the engine and the load thereon (S4).

The CPU 31 substitutes the temperature of the first electrode 23, the supply energy, and the spark discharge voltage into the first calculation equation 36, and calculates a wearing rate of the first electrode 23 in one spark discharge (S5). Next, the CPU 31 estimates the number of times of discharge in a processing time (from the start through S1 to S9 until a time when the processes is returned to S1 again) in which the gap length estimation process is performed once, based on the rotation speed of the engine, multiplies the wearing rate of the first electrode 23 in one spark discharge by the number of times of discharge, and estimates a wearing rate of the first electrode 23 in the processing time in which the gap length estimation process is performed once, and adds the estimated wearing rate to the first variable 39 (S6).

Similarly, the CPU 31 substitutes the supply energy and the spark discharge voltage into the second calculation equation 37, and calculates a wearing rate of the second electrode 27 in one spark discharge (S7). Next, the CPU 31 multiplies a wearing rate of the second electrode 27 in one spark discharge by the number of times of discharge, estimated from the rotation speed of the engine, in the processing time in which the gap length estimation process is performed once, estimates a wearing rate of the second electrode 27 in the processing time in which the gap length estimation process is performed once, and adds the estimated wearing rate to the second variable 40 (S8).

Next, the CPU 31 converts each of the first variable 39 and the second variable 40 to a gap length (S9). In the process step of S9, gap lengths which increase due to wear of the first electrode 23 and the second electrode 27 are individually estimated by using estimation results of wearing rates of the first electrode 23 and the second electrode 27 because the cross-sectional areas of the first electrode 23 and the second electrode 27 are known.

The CPU 31 adds an increase amount of a gap length based on wear of the first electrode 23 and an increase amount of a gap length based on wear of the second electrode 27 to each other (S10), and determines whether or not a sum of the two gap lengths (increase amounts) is greater than a threshold valve (S11). The threshold valve is set as a gap length (increase amount) at which, for example, desired emission and output of the engine are not obtained, engine starting by the spark plug 20 is difficult, or misfire is likely to occur while an automobile is running.

When the sum of the two gap lengths is greater than the threshold valve as a result of the process step of S11 (S11: Yes), the CPU 31 lights up the alarm lamp 44, to promote change of the spark plug 20 (S12). Thus, desired emission and output of the engine can be prevented from being not obtained, engine starting can be prevented from being difficult, or misfire can be prevented from easily occurring while an automobile is running. When the spark plug 20 has been changed to a new one, the first variable 39 and the second variable 40 are reset. Meanwhile, when the sum of the two gap lengths is less than or equal to the threshold valve (S11: No), the CPU 31 returns the process to S1.

In the gap length estimation process, a wearing rate of the first electrode 23 in one spark discharge is estimated by using the first calculation equation 36 based on a temperature of the first electrode 23, and spark discharge voltage and supply energy from the ignition coil 11. In the first electrode 23 that contains any one of Ir, Ru, W, and Ni as a main component, electrode wear is influenced by high temperature oxidation. Therefore, by estimating a wearing rate based on a temperature of the first electrode 23, and spark discharge voltage and supply energy from the ignition coil 11, accuracy for result of estimating a wearing rate of the first electrode 23 can be improved.

A wearing rate of the second electrode 27 in one spark discharge is estimated by using the second calculation equation 37 based on spark discharge voltage and supply energy from the ignition coil 11. The second electrode 27 that contains Pt as a main component is less likely to be subjected to high temperature oxidation. Therefore, a wearing rate is estimated based on spark discharge voltage and supply energy from the ignition coil 11, whereby accuracy for result of estimating a wearing rate of the second electrode 27 can be improved. Furthermore, by utilizing the fact that the second electrode 27 containing Pt as a main component is less likely to be subjected to high temperature oxidation, the temperature of the second electrode 27 is eliminated from parameters for the second calculation equation 37, whereby a load of calculation on, for example, the CPU 31 using the second calculation equation 37 can be reduced.

A wearing rate of the first electrode 23 is estimated according to the first calculation equation 36. A wearing rate of the second electrode 27 is estimated according to the second calculation equation 37. Therefore, each of electrode wearing rates of the first electrode 23 and the second electrode 27 made of different materials, respectively, can be accurately estimated.

After wearing rates of the first electrode 23 and the second electrode 27 are individually estimated, an increase amount of the spark gap 28 between the first electrode 23 and the second electrode 27 is estimated according to the result of estimation of the wearing rates. Since an increase amount of a gap length based on wear of the first electrode 23, and an increase amount of a gap length based on wear of the second electrode 27 can be each estimated, an amount of increase of the spark gap 28 can be accurately estimated by adding the increase amounts of the gap lengths.

In the flow chart of the gap length estimation process shown in FIG. 4, the process steps of S1, S2, S3, and S4 correspond to a first obtaining unit recited in the claims, and the process steps of S1, S2, and S3 correspond to a second obtaining unit recited in the claims. The process step of S5 corresponds to a first wearing rate estimation unit recited in the claims, and the process step of S7 corresponds to a second wearing rate estimation unit. When the first calculation equation 36 uses a parameter other than the three parameters that are a temperature of the first electrode 23, and spark discharge voltage and supply energy from the ignition coil 11, or when the second calculation equation 37 uses a parameter other than the two parameters that are spark discharge voltage and supply energy from the ignition coil 11, the ECU 30 obtains, from various input devices, information on the parameters necessary for the calculations.

As described above, although the present invention has been described based on the embodiments, the present invention is not limited to the above-described embodiments at all. It can be easily understood that various modifications can be devised without departing from the gist of the present invention.

In the present embodiment, information on a temperature of the first electrode 23, and spark discharge voltage and supply energy from the ignition coil 11 is obtained according to the detection results from the crank angle sensor 42 and the throttle sensor 43. However, the present invention is not necessarily limited thereto. Needless to say, information on a temperature of the first electrode 23, and spark discharge voltage and supply energy from the ignition coil 11 may be obtained by using a sensor other than the crank angle sensor 42 and the throttle sensor 43. Examples of the other sensor include an accelerator operation detection sensor for detecting an operation amount of an accelerator pedal, and a vehicle speed sensor.

In the present embodiment, the ECU 30 mounted to an automobile has a function of the electrode wearing rate estimating apparatus, and estimates wearing rates of the first electrode 23 and the second electrode 27 of the spark plug 20 mounted to the engine. However, the present invention is not necessarily limited thereto. Needless to say, wearing rates of the first electrode 23 and the second electrode 27 may be estimated by using the method described in the embodiments when the spark plug 20 is designed, and necessary sizes of the first electrode 23 and the second electrode 27 may be estimated.

In this case, firstly, a running distance, of an automobile, to be ensured by the spark plug 20 is set, and how the automobile is used in the running distance is estimated. At this time, the number of hours of each operation state of the engine in the entirety of an operating time up to the running distance is specifically estimated. The number of hours can be estimated with enhanced accuracy by specifying a kind of the automobile and using an empirical rule or the like. Next, the number of times of discharge of the spark plug 20 during a time for each operation state of the engine, is estimated, and a temperature of the first electrode 23, and spark discharge voltage and supply energy from the ignition coil 11 are further estimated in each operation state.

Next, the temperature of the first electrode 23, and the spark discharge voltage and supply energy from the ignition coil 11 are substituted into the first calculation equation 36, and a wearing rate of the first electrode 23 in one spark discharge is estimated, and the estimated wearing rate is multiplied by the number of times of discharge, whereby a wearing rate of the first electrode 23 in the time for each operation state is estimated. A wearing rate of the first electrode 23 in the running distance, of the automobile, to be ensured by the spark plug 20 is estimated according to the sum of the wearing rates.

Similarly, the spark discharge voltage and the supply energy from the ignition coil 11 are substituted into the second calculation equation 37, and a wearing rate of the second electrode 27 in one spark discharge is estimated, and the estimated wearing rate is multiplied by the number of times of discharge, whereby a wearing rate of the second electrode 27 in a time for each operation state is estimated. A wearing rate of the second electrode 27 in the running distance, of the automobile, to be ensured by the spark plug 20 is estimated according to the sum of the wearing rates.

When the spark plug 20 is designed by using the wearing rates of the first electrode 23 and the second electrode 27 having been thus estimated, necessary sizes of the first electrode 23 and the second electrode 27 can be estimated by the wearing rates being each multiplied by a safety factor. Thus, the spark plug 20, which ensures the running distance of an automobile, need not have the first electrode 23 and the second electrode 27 which are excessively large. Accordingly, while the quality of the spark plug 20 is assured, materials of the first electrode 23 and the second electrode 27 can be reduced, and this contributes to resource saving.

In the present embodiment, the first electrode 23 that contains any one of Ir, Ru, W, and Ni as a main component is disposed on the center electrode 22 side of the spark plug 20, and the second electrode 27 that contains Pt as a main component is disposed on the ground electrode 26 side thereof. However, the present invention is not necessarily limited thereto. Needless to say, the second electrode 27 that contains Pt as a main component may be disposed on the center electrode 22 side of the spark plug 20, and the first electrode 23 that contains any one of Ir, Ru, W, and Ni as a main component may be disposed on the ground electrode 26 side thereof.

In the present embodiment, in one spark plug 20, both the first electrode 23 that contains any one of Ir, Ru, W, and Ni as a main component, and the second electrode 27 that contains Pt as a main component are disposed. However, the present invention is not necessarily limited thereto. Also when any one of the first electrode 23 and the second electrode 27 is disposed in the spark plug 20, since a wearing rate of the first electrode 23 and a wearing rate of the second electrode 27 can be individually estimated, the same effect as described in the embodiments can be obtained.

In the present embodiment, the ECU 30 estimates both a wearing rate of the first electrode 23 and a wearing rate of the second electrode 27. However, the present invention is not necessarily limited thereto. Needless to say, only a wearing rate of the first electrode 23 may be estimated or only a wearing rate of the second electrode 27 may be estimated. Needless to say, also when the spark plug 20 is designed, only a wearing rate of the first electrode 23 may be estimated or only a wearing rate of the second electrode 27 may be estimated.

DESCRIPTION OF REFERENCE NUMERALS 11 ignition coil
20 spark plug
23 first electrode (electrode)
27 second electrode (electrode)
28 spark gap
30 ECU (electrode wearing rate estimating apparatus)

The invention claimed is:

1. A spark plug electrode wearing rate estimating apparatus for a spark plug in which spark discharge occurs between two electrodes by application of voltage generated by an ignition coil, the apparatus comprising:
a first electrode that is at least one of the two electrodes and that contains any one of Ir, Ru, W, and Ni as a main component;
a first obtaining unit configured to obtain information on a temperature of the first electrode, and spark discharge voltage and supply energy from the ignition coil; and
a first wearing rate estimation unit configured to estimate a wearing rate of the first electrode in one spark discharge based on the information.

2. A spark plug electrode wearing rate estimating apparatus for a spark plug in which spark discharge occurs between two electrodes by application of voltage generated by an ignition coil, the apparatus comprising:
a second electrode that is at least one of the two electrodes and that contains Pt as a main component;
a second obtaining unit configured to obtain information on a spark discharge voltage and supply energy from the ignition coil; and
a second wearing rate estimation unit configured to estimate a wearing rate of the second electrode in one spark discharge based on the information.

3. A spark plug electrode wearing rate estimating method for a spark plug in which spark discharge occurs between two electrodes by application of voltage generated by an ignition coil, the method comprising the steps of:
providing two electrodes, at least one of which is a first electrode that contains any one of Ir, Ru, W, and Ni as a main component, and
estimating a wearing rate of the first electrode in one spark discharge, based on a temperature of the first electrode, and a spark discharge voltage and supply energy from the ignition coil.

4. A spark plug electrode wearing rate estimating method for a spark plug in which spark discharge occurs between two electrodes by application of voltage generated by an ignition coil, the method comprising the steps of:
providing two electrodes, at least one of which is a second electrode that contains Pt as a main component, and estimating a wearing rate of the second electrode in one spark discharge based on a spark discharge voltage and supply energy from the ignition coil.

5. The spark plug electrode wearing rate estimating method according to claim 1, further comprising the steps of:
providing a second electrode that contains Pt as a main component, and
estimating a wearing rate of the second electrode in one spark discharge based on a spark discharge voltage and supply energy from the ignition coil.

6. The spark plug electrode wearing rate estimating method according to claim 5, comprising the step of estimating an increase amount of a spark gap between the two electrodes based on results obtained after wearing rates of the first electrode and the second electrode have been estimated in the steps of estimating the wearing rate of the first electrode and the second electrode.

* * * * *